June 12, 1956  E. L. WASHBURN  2,750,546
LIMIT RESPONSIVE MEANS FOR MOTORS IN SERVO SYSTEMS AND THE LIKE
Filed March 24, 1953
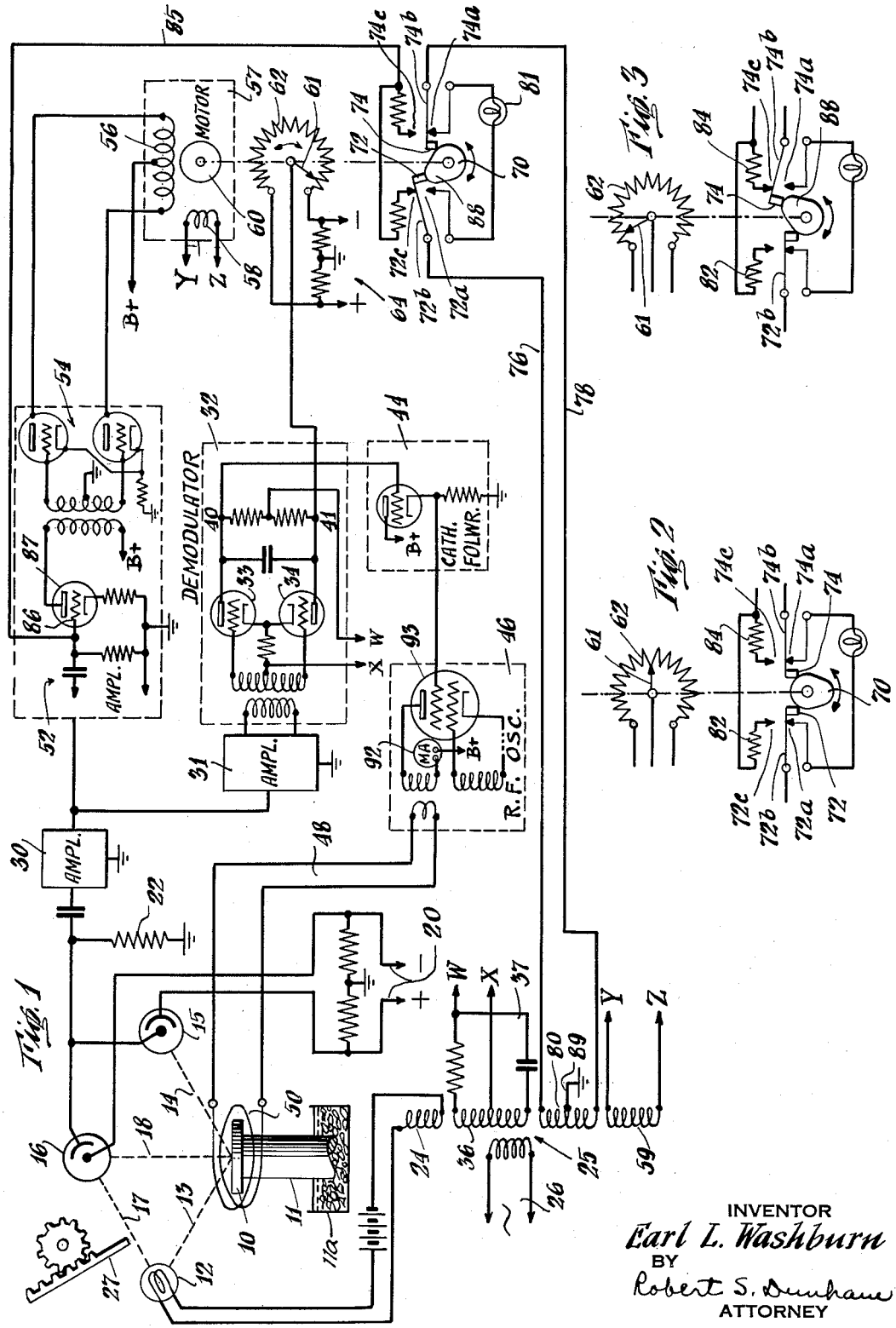
INVENTOR
*Earl L. Washburn*
BY
*Robert S. Dunham*
ATTORNEY United States Patent Office 2,750,546
Patented June 12, 1956

2,750,546

LIMIT RESPONSIVE MEANS FOR MOTORS IN SERVO SYSTEMS AND THE LIKE

Earl L. Washburn, Arlington Heights, Ill., assignor to Wallace & Tiernan Incorporated, a corporation of Delaware Application March 24, 1953, Serial No. 344,375

9 Claims. (Cl. 318—28)

This invention relates to range control apparatus and particularly to range control or range-responsive means in servo systems and the like, e. g. wherein under appropriate signals a motor or similar driving device is arranged to adjust a desired instrumentality through a given range. An important specific adaptation of the invention is in electrical dew-point hygrometers, especially such apparatus in which electrical servo loops are employed in response to the photo-electrically detected condition of a dew-forming element, with the object of maintaining a predetermined dew condition so that the temperature of the element can be measured as representing the dew-point of the air or other gas to which the element is exposed.

An important object of the invention is to provide new and improved means responsive to the arrival of a servo motor or a motor adjusted device at a determinable limit, a more specific object being to afford novel means for preventing drive beyond a predetermined range limit.

Another object of the invention is to provide apparatus of the character described, wherein a characteristic signal or warning is afforded upon arrival of a servo motor or its driven device at one or more limits of a given range, and preferably wherein other control is simultaneously exerted, e. g. as to prevent damage or other undesired effect by over-drive of the motor, or, if desired, to effectuate special control of other equipment.

An additional object is to afford new and advantageous means for control of the range to which a servo motor or the like is responsive, especially for preventing damage or derangement of the apparatus by effort to adjust beyond a desired limit, and preferably also to afford a warning or other translated response simultaneously with limit-responsive control of the driving instrumentality.

To these and other ends, the invention, in its presently preferred forms, comprises a reversible motor or like driving instrumentality arranged to adjust a desired device under control of an appropriate system, such as an electrical signal circuit. In accordance with the invention, the mechanically driven system, e. g. the moving part of the motor or the shaft or other means actuated by it, is provided with instrumentalities responsive to arrival of such driven system at a predetermined locality, indeed preferably at either of two localities respectively representing the ends of a predetermined range of adjustment. Such means, conveniently embodied as cam-operated contacts, are effective not only to interrupt drive but to initiate reverse drive, a particularly successful arrangement of the invention being such that a reversing signal is temporarily applied in the control circuit for the motor so as to drive it briefly away from the selected locality. In consequence of operation in the manner last described, the apparatus upon reaching the stated limiting locality then automatically and repeatedly backs way from and moves toward the limit, i. e. reciprocates so to speak in the vicinity of the limit without exceeding the latter. At the same time, conveniently by the same instrumentality, appropriate translation of the arrival of the motor at the limit is also afforded, e. g. for operation of a warning signal or for other control purposes.

In accordance with a specific feature of invention, the combination of means of this character with a servo loop of an electrical dew-point hygrometer is arranged for response to limiting conditions of the heating or cooling means employed to regulate the temperature of the dew-forming element. As will be explained in more detail in connection with the illustrated embodiment of the invention, one particular type of dew-point hygrometer, which is described in the copending application of H. C. McBrair, Serial No. 333,877, filed January 29, 1953, now Patent No. 2,720,107 granted October 11, 1955, involves a so-called slow speed servo loop for regulating the amount of dew to be maintained on the surface of the element, such loop being specifically effective to adjust the control of electrical heating means for the element from time to time, in cooperation with certain rapidly-responsive control means that maintain primary balance of the system. When embodied in the described slow speed loop of such apparatus, the devices of the present invention afford special response, for example, to depletion or excess of cooling effect which is simultaneously and continuously exerted on the dew-forming element and with which the heating means is expected to balance at all times.

The specific nature and function of the improved range-responsive means, as well as further features and advantages thereof, will be more fully apparent from the following description and annexed drawings of a presently preferred embodiment.

Referring to the drawings:

Fig. 1 is a schematic and somewhat simplified wiring diagram of an electrical dew-point hygrometer in which apparatus of the present invention is embraced, such apparatus being shown at one limiting position;

Fig. 2 is a fragmentary view of the range control apparatus of Fig. 1, at an intermediate position; and Fig. 3 is a similar fragmentary view, showing the apparatus at the opposite limiting position.

In Fig. 1, the illustrated dew-point hygrometer comprises a small dew-forming element 10, consisting of a metal mirror or the like, shown in elevation and having an upwardly facing surface that is exposed to air or other gas for which dew-point measurement is desired. Through a suitable column 11 of copper or the like, the small mirror 10 is arranged in thermally conductive relation to appropriate coolant means 11a such as a mixture of Dry Ice and alcohol, whereby a continuous cooling effect is exerted, preferably of a character tending to reduce the mirror temperature to a very low value. Means such as a thermocouple at the mirror surface (not shown) may also be included for detecting the actual mirror temperature, to provide the desired indication of dew-point. It will be understood that the instrumentalities just described may all be conventional and therefore need not be depicted in detail.

An electric lamp 12 directs a beam of light 13 angularly upon the mirror so that a specularly reflected beam 14 (varying inversely with dew on the mirror) reaches a phototube 15. At the same time, another phototube 16 is arranged to receive light from the lamp otherwise than by specular reflection, for example, light coming directly (at 17) from the lamp, and also (for increase of differential effect) light traveling the path 18 from the mirror surface by diffused reflection, e. g. such diffused reflection being caused by dew and varying with the amount of dew. The phototubes 15, 16 are connected in a D. C. bridge circuit as shown, being energized by a supply of direct current 20, so that upon unbalance of the bridge a voltage is developed across the output resistor 22.

In accordance with the system of the above cited McBrair application, the lamp 12 is energized by alternating current, i. e. specifically a sinusoidal current derived from secondary 24 of a transformer 25 and made appropriately unidirectional so that there is one increasing sinusoidal pulse of illumination of the lamp 12 and one sinusoidal decreasing pulse of illumination about a mean light level for each cycle of alternation in the alternating current supply 26. In consequence if there is unbalance of the phototube bridge, an alternating current signal appears across the resistor 22. A shutter 27 in the path of the direct light beam 17 is adjusted so that the bridge will be balanced, for zero signal at 22, when there is a certain amount of dew on the mirror 10. Hence when a signal appears at 22, the magnitude of the signal will represent the extent of departure of the mirror from the desired dew condition and the phase of the signal (relative to the line current 26, supplied to the transformer 25) will represent the direction of departure, i. e. whether in the condition of excessive dew or of insufficient dew.

For rapid restoration of equilibrium of the system upon any change of condition at the mirror surface, the signal across the resistor 22 is applied in a so-called high speed servo loop, which includes suitable electronic amplifiers (of A. C. type) 30 and 31, and a so-called demodulator 32. The latter may comprise, for example, a pair of triodes 33, 34 arranged to receive alternate halves of the signal wave from the amplifier 31 and to detect the same against a locally applied alternating current signal (at X, W) as derived from secondary 36 of the transformer 25. The transformer secondary 36 may have a suitable phase-adjusting network 37, as shown, so as to insure proper correlation of phase between the signal and the alternating voltage which the secondary 36 supplies to the demodulator. In consequence a D. C. signal is provided between the points 40, 41, being respectively the plates of the triodes 33, 34, when and if a bridge-unbalance A. C. signal has appeared at the resistor 22. The D. C. signal across the center tapped resistor between 40, 41, has a polarity corresponding to the direction of bridge unbalance and a value proportional to the amount of unbalance.

The signal in the demodulator output as just described controls the grid bias of a cathode follower stage 44, which in turn controls the screen voltage of a radio frequency oscillator 46, the cathode follower serving as an impedance-changing device for optimum control of the oscillator 46. The oscillator through a transmission line 48, supplies radio frequency current to a small coil 50 which surrounds the mirror 10 and thus heats the same, e. g. by induction. It will now be seen that the amount of heating current thus supplied to the coil 50 is practically instantaneously controlled by the photoelectric bridge 15, 16, through the high speed servo loop just described. Thus for example if the dew-point of the air over the mirror 10 rises (from a condition where an equilibrium amount of dew had existed on the mirror), more dew will tend to form, reducing the specularly reflected light 14 and increasing the diffusely reflected light 18. The resulting unbalance A. C. signal, as amplified and translated in the high speed loop, is therefore of such magnitude and direction as to increase the output of the oscillator 46, supplying more heating energy to the coil 50. The system is thus rapidly brought to a new point of equilibrium, with the mirror at a higher temperature, representative of restoration of proper dew condition and thus of actual dew-point. Should the dew-point of the air over the mirror fall, reverse operation occurs, diminishing the R. F. output of the oscillator and permitting the mirror temperature to fall, i. e. by reason of the effect of the cooling means including the column 11.

Since at any given dew-point it is necessary to have a maintained operation of the oscillator 46 for properly opposing the coolant effect on the mirror, and since at higher dew-points the maintained oscillation would thus (with the high speed servo loop alone) require some constant output signal of the same sort that calls for increase of positive voltage or bias on the oscillator screen grid, the natural tendency of the system will therefore be to maintain a somewhat greater amount of dew at higher dew-points than at lower ones, such larger amount of dew being necessary in order to afford the continuing signal. Over a wide range of dew-point temperatures, this results in some inaccuracy and therefore in further accordance with the invention of the aforesaid McBrair application, a slow speed servo loop is included, for independently adjusting the bias on the oscillator from time to time, to maintain a constant amount of dew at all dew-point temperatures.

Specifically, such further apparatus includes a supplemental amplifier 52 which also simultaneously receives the bridge unbalance signal, if any, from the amplifier 30, and which has a push-pull output stage 54 that is arranged to energize the center tapped control winding 56 of a reversible alternating current motor 57 having a principal energizing winding 58 which is connected, e. g. as shown, for current supply from the transformer 25 (through connections Y, Z to a secondary 59 on the transformer). The rotor 60 of this servo motor 57 is arranged to drive the contact arm 61 of a potentiometer 62, the latter being connected across a suitably center-grounded D. C. source 64 and also being connected in series with the output 40—41 of the demodulator 32, in the grid circuit of the cathode follower 44. In consequence the total bias of the cathode follower is thus composed of the algebraic sum of the voltages derived from the demodulator and the potentiometer 62, the connection to the latter being between its arm 61 and the phantom center ground of its resistance. By virtue of the electromechanical nature of the servo loop section just described, the adjustment of bias in the cathode follower and thus on the R. F. oscillator, effected through the motor and the potentiometer 62, is much slower in time than the immediate adjustment by the signal developed in the demodulator output.

As will now be seen, the slow speed loop, conveniently called an automatic threshold control, affords appropriate change of bias for the oscillator from time to time, so as to maintain an essentially constant amount of dew on the surface of the mirror 10, throughout a very wide range of dew-points. For example, if the dew-point rises to a condition where an appreciable, continuing output signal of the demodulator would otherwise be necessary in order to keep the oscillator 46 in operation at a corresponding high output of R. F. current, the same bridge signal transmitted to the control winding 56 of the servomotor 57 effects an adjustment of the potentiometer 62 such as to add the required heat-sustaining bias in the grid circuit of the cathode follower. Thus the signal from the phototube bridge may be restored to zero (representing precisely the desired amount of dew on the mirror surface), such restoration at the same time bringing the motor 57 to rest, in that current through the winding 56 then becomes zero. Should the air or other gas over the mirror exhibit a large decrease of dew-point, reverse operations occur, reducing the base or fundamental bias on the oscillator, and again permitting the system to come to equilibrium (through the function of the high speed loop) at the desired amount of dew rather than at a condition of undesirably thin dew. In consequence, the surface temperature of the mirror may at all times be very accurately taken to represent the dew-point, being always related to the latter by provision of the same, calibrated amount of dew.

It will be understood that in the drawing and in the foregoing description, details of various electronic and other instrumentalities are omitted, e. g. in the various amplifying and other elements, inasmuch as such parts will be well known to those skilled in the art, and in any event can be further ascertained by reference to the aforesaid McBriar application.

In accordance with the present invention the motor-driven system, for example on the shaft that turns the potentiometer contact arm 61, carries a cam 70, which is engageable by a pair of contact operating members or followers 72, 74, e. g. at selected, opposite end points in the path of travel of the potentiometer arm 61. In Fig. 2 the cam 70 and followers 72, 74 are shown in normal position, e. g. the condition of the followers for all positions of the contact arm 61 except at or near the ends of its path. In such condition, the followers 72, 74 respectively effect closure of contacts 72a, 74a, i. e. between the follower-actuated contact arms 72b, 74b and fixed contact elements as shown. As will be apparent from Fig. 1, the contact arms 72b, 74b are connected via conductors 76, 78 to a secondary 80 of the transformer 75 and the fixed contacts are connected to a lamp 81, so that during normal operation the lamp will remain continuously illuminated. The apparatus also includes another pair of fixed contact elements respectively cooperating with the above-described contact arms to provide normally open sets of contacts 72c, 74c; of the latter, the fixed contact elements are connected respectively through current-limiting resistors 82, 84, to a common conductor 85 and thereby to the input, e. g. the grid 86 of the vacuum tube 87 constituted in the amplifier 52.

As will now be seen from Fig. 1, drive of the potentiometer arm 61 (e. g. in a clockwise direction from Fig. 2) to one end of its winding brings the high spot 88 of the cam 70 under the follower 72, thereby closing contacts 72c and opening contacts 72a. Similarly, when the potentiometer arm 61 reaches the other end of its path, as by drive counterclockwise from the position of Fig. 1, the high spot 88 of the cam will engage the follower 74 so as to close the contacts 74c and open the contacts 74a.

Assuming that the first situation has occurred it will be seen that the circuit to the lamp 81 is broken, while at the same time the conductor 76 is connected to one end of the transformer winding 80. Since this winding has a grounded center tap 89 and since the cathode side of the input of amplier 52 is likewise grounded, the closure of contact 72c connects one-half of the winding 80 across the input of the amplifier 52. The phase of the alternating E. M. F. in this half of the winding 80 being appropriately selected, the signal thus applied to the amplifier input fully overrides the bridge unbalance signal (via amplifier 30) which had been effectuating drive of the motor 57, and in consequence the motor is caused to operate in the reverse direction, backing the potentiometer arm 61 away from its terminal point and likewise moving the cam (counterclockwise) away from the position shown in Fig. 1. Thereupon the contacts 72c promptly open, interrupting the reverse drive of the motor, while contacts 72a close, re-illuminating the lamp 81. With the overriding signal thus removed from the input of the amplifier 52 the original bridge signal again drives the motor forward and brings the high spot 88 of the cam under the follower 72. The cycle is thus continuously repeated again and again, causing the lamp to blink and preventing the motor from moving beyond the terminal point, or indeed from traveling far in the reverse direction.

If the potentiometer arm 61, however, has been moved to the opposite extremity as shown in Fig. 3, a similar repetitive sequence of operations is initiated when the high spot 88 comes under the follower 74. In this case, however, the opposite half of the transformer winding 80 is connected across the input of the amplifier 52, thus properly opposing the phase of the signal which had caused the drive of the motor to this end of the path of potentiometer arm travel. Again the motor-driven assembly repeatedly moves up to and back slightly away from the end of its path, while the lamp 81 likewise blinks on and off to give warning of the condition reached in adjustment of the potentiometer 62.

In other words, so long as the adjustment effected by the motor 57 is within the normal operating range of the potentiometer 62, the lamp 81 remains steadily lighted (indicating that everything is normal) and there is no other function performed by the range-responsive instrumentalities. On the other hand, should the conditions be such that the potentiometer arm is driven to the end of its range in either direction, the above-described consequences ensue. The described means interpose a temporary overriding signal in the motor control circuit, causing reversal of the motor for a short distance, whereupon renewed drive in the original direction occurs, and the potentiometer arm thus reciprocates slightly back and forth (as the cycle is repeated) in the vicinity of the selected range limit. Thus there can be no damage to the motor or the potentiometer or any other parts by driving the assembly beyond the proper terminal point, yet at the same time the entire system is maintained in operative state, except for the temporary, intermittent, overriding signal imposed in the motor control circuit. At the same time a positive warning or indication is given that an abnormal condition has arisen, e. g. by the blinking or interrupted illumination of the lamp 81.

It will be appreciated that in normal operation of the dew-point hygrometer shown, with proper supply of coolant for the mirror 10 and other instrumentalities functioning properly, the potentiometer arm will ordinarily be kept within its intended range and the limiting devices will not be brought into play. On the other hand, if the adjustment of the potentiometer arm cannot bring about proper balance of cooling and heating effects on the mirror, i. e. so as to reduce the phototube bridge signal to zero, the potentiometer arm will reach one end or the other of its path and the present range control means will be operated.

For example, should the supply of coolant for the mirror 10 become unduly depleted, e. g. in cooling effect, a point may soon be reached where the output of the R. F. oscillator 46 cannot be reduced sufficiently to provide bridge balance, even though the potentiometer arm 61 is brought to its lowest biasing point, e. g. as illustrated in Fig. 1. In such condition, as just explained, a phototube bridge signal calling for still further decrease of heating oscillations will persist, even though the potentiometer arm approaches the end of its path. The range control devices thus come into play and the flashing lamp 81 signals the difficulty. The nature of the difficulty, i. e. in depletion of coolant may be readily determined by observation of a milliammeter 92 in the plate circuit of the R. F. oscillator tube 93; knowing the normal range of oscillator current, a low reading of the milliammeter 92 at a time when the lamp 81 blinks will indicate that the coolant is depleted.

On the other hand, should an excess of coolant have been applied in the vessel (not shown) into which the column 11 projects, so that, for example, at low dew-point temperatures the oscillator cannot sufficiently heat the mirror even though maximum voltage is applied to the biasing grid of the tube 93, the potentiometer arm 61 will correspondingly have been driven to its high point (Fig. 3) while a signal from the phototube bridge remains to call for further heating. Again the blinking lamp indicates the abnormal condition, while the high reading of the milliammeter 92 shows that it is occasioned by excess of coolant material.

It will now be appreciated that the described instrumentalities afford novel and effective range-responsive means, preventing damage to any of the mechanical or electrical parts of the servomotor assembly and in fact advantageously avoiding the necessity for positive stops, brakes or like means. The motor 57 may safely be of considerable power, for superior effectiveness in its normal function of adjusting the potentiometer 62. While other instrumentalities, such as automatic refrigeration means, can be controlled by the illustrated or other similar range-responsive contacts, the arrangement of the devices shown for control of a lamp 81 not only exemplifies the control function of the invention but affords a notably effective instrument. That is to say, the lamp 81 thus serves a two-fold purpose, in that its steady illumination gives evidence of normal operation while its periodic blinking affords prompt warning of conditions requiring attention by the operator. It will also be appreciated that although the range control means have been illustrated in connection with a specific type of dew-point hygrometer, these instrumentalities are applicable to other uses, especially in servomotor systems where like provision for security of operation, warning of abnormality or other control function may be desired.

A further advantage of the arrangement is that the range-responsive means may be designed or set to function at any desired locality of travel of the motor-driven assembly, e. g. by suitable proportioning and arrangement of the cam 70. In other words the cam and its associated follower means are effective, in themselves, to define the limit or limits of a range through which the motor-driven parts are to operate, i. e. regardless of the nature of the mechanical structure. Thus for instance, the range control means, including the circumferential length of the high spot of the cam 88, may be conveniently designed to select any desired part or all of the resistor section 62 over which the arm 61 is to be adjusted for normal functioning.

It is to be understood that the invention is not limited to the specific apparatus herein shown and described but may be embodied in other forms without departure from its spirit.

I claim:

1. Range control apparatus comprising, in combination, a device adjustable along a predetermined path, reversible motor means having a reversing control circuit therefor, for driving said device in a direction corresponding to the phase of a signal in said control circuit, and means including separate signal supply means and contact means connected thereto and releasably engageable by the device upon its arrival at a predetermined locality of said path, for applying in said control circuit a signal of opposite phase to the signal under which the motor means drives the device to said locality, for causing the motor to drive the device away from the locality until disengagement from said contact means interrupts application of said last-mentioned signal, to reinitiate drive of the motor means towards said locality.

2. Range control apparatus as described in claim 1, which includes supplemental contact means associated with the aforesaid contact means, a signaling device having a control circuit connected with said supplemental contact means, said supplemental contact means being normally closed during disengagement of the device with the first contact means, and being opened upon engagement of the device with said first contact means, to provide continuous energization of the signal device when the first-mentioned device is disposed at regions separated from said locality and to provide intermittent operation of the device, when the first-mentioned device has been driven to said locality.

3. In a servo system, in combination, a device adjustable along a predetermined path, a signal circuit adapted to receive alternating current signals, for controlling adjustment of said device in a direction corresponding to the phase of the received signal, a reversible motor having reversing-control winding means connected to said signal circuit for control thereby, for adjusting said device, and means including an element adjusted with the device by the motor and an element disposed at a predetermined locality in said path and releasably engageable by the first element upon drive of said device to said locality, for temporarily injecting in said signal circuit a supplemental signal phased for drive of the motor in a direction away from said second element so long as said elements are engaged, said last-mentioned means comprising an alternating current source separate from said signal circuit and contact means associated with the second element for connecting said signal source with the signal circuit for injecting said supplemental signal in said signal circuit as an alternating current signal opposite in phase to the first-mentioned received signal, to effect drive of said first element by the motor repeatedly away from and into engagement of said elements at said locality.

4. Apparatus as described in claim 3 which includes a supplemental signal circuit, supplemental contact means associated with the first contact means and normally maintaining said supplemental signal circuit in one condition and shifted during mutual engagement of said elements to place said supplemental signal circuit temporarily in another condition, for repeatedly changing the condition of said supplemental signal circuit when the motor is repeatedly caused to drive the first element from said locality, and a distantly perceptible signal device controlled by said supplemental circuit and thereby repeatedly operated in accordance with said repeated drive of the motor.

5. In a dew-point hygrometer, in combination, a dew-forming element, light sensitive means inspecting the element for producing a signal in response to departure of the element from a predetermined dew condition, temperature changing means for the element comprising heating means and cooling means, rapidly responsive electrical servo means for adjusting one of said temperature changing means in response to a signal from the light sensitive means, to restore equilibrium of the dew condition of the element upon departure therefrom, a second servo means comprising a supplemental control device for the last-mentioned one of the temperature changing means, a reversible motor for adjusting said control device, and a signal circuit extending from said light sensitive means to said reversible motor for controlling the latter, to adjust the last-mentioned temperautre changing means to restore the dew condition of the first-mentioned element to the predetermined condition upon continuing departure therefrom, said device being adjustable along a predetermined path by said motor, a supplemental electrical signal source separate from said signal circuit, and means associated with said device and including control means engageable at a predetermined terminal locality of the aforesaid path and responsive to drive of the device by the motor to said locality, for temporarily connecting said separate source with the signal circuit of the second servo means to inject therein a signal for causing the motor to drive the device in the reverse direction until the device is moved away from said locality.

6. In a dew-point hygrometer, in combination, a dew-forming element, light sensitive means inspecting the element for producing an electrical signal responsive to departure of the element from a predetermined amount of dew thereon and having a phase representing the direction of such departure, temperature changing means for the element comprising heating means and cooling means, servo means comprising a control device for one of said temperature changing means, a reversible motor for adjusting said control device in a direction corresponding to the phase of a signal supplied to said motor, and a signal circuit extending from said light sensitive means to said reversible motor for controlling the latter, to adjust the last-mentioned temperature changing means in a direction to restore the dew condition of the first-mentioned element to said predetermined amount upon departure therefrom, said device being adjustable along a predetermined path by said motor, an alternating current source separate from said signal circuit, and means including a control element adjusted by the motor with the device and a control element located in said path to define a terminal of the range of adjustment of the device and releasably engageable by the first element upon drive of said device to said locality, for temporarily connecting said separate source with the said signal circuit to inject therein an overriding signal phased for drive of the motor in a reverse direction away from said second control element until said control elements are thereby disengaged to restore drive of the motor toward said locality and for repeating said reverse and restored drives of the motor to keep the device substantially in the vicinity of said locality.

7. A dew-point hygrometer as defined in claim 6 which includes a signal device having an energizing circuit, and contact means associated with said second control element and controlling said energizing circuit, said contact means being constructed and arranged to maintain said energizing circuit closed when the control elements are disengaged and to open said energizing circuit upon engagement of the control elements, for maintaining said signal device continuously actuated during normal adjustment of the control device and for periodically actuating the signal device when the control device reaches the aforesaid terminal.

8. A dew-point hygrometer as defined in claim 7 in which the signal-injecting means includes a third control element located in the path to define an opposite terminal of the said range and engageable by the first control element, for temporarily injecting in the control circuit an overriding signal phased for drive of the motor in a direction away from the third control element, to effect corresponding repeated reverse and restored drives of the motor near the locality of the third element, and which includes a second contact means associated with the third control element and cooperating with the first contact means in control of the aforesaid energizing circuit to maintain the latter closed during normal adjustment of the control device and to effect periodic actuation of the signal device when the control device reaches said opposite terminal.

9. A dew-point hygrometer as defined in claim 5 wherein the means to inject the signal causes the motor to drive the device repeatedly away from and to said locality, and which includes lamp means, an energizing circuit therefor and contact means in said energizing circuit actuated by said control means, to provide intermittent operation of the lamp means when the motor is effecting said repeated drive of the device and continuous operation of the lamp means when the device is continuously away from said terminal locality.

References Cited in the file of this patent

UNITED STATES PATENTS

| | | |
|---|---|---|
| 1,687,501 | Liddiard | Oct. 16, 1928 |
| 2,376,513 | Shaffer | May 22, 1945 |
| 2,577,483 | Roosdorp | Dec. 4, 1951 |
| 2,588,742 | McCallum | Mar. 11, 1952 |
| 2,594,428 | Hall | Apr. 29, 1952 |
| 2,603,760 | Kocher | July 15, 1952 |
| 2,624,195 | Von Allen | Jan. 6, 1953 |
| 2,633,558 | Wild | Mar. 31, 1953 |
| 2,648,040 | Schneider | Aug. 4, 1953 |